(12) United States Patent
Kusanale et al.

(10) Patent No.: US 9,945,747 B1
(45) Date of Patent: Apr. 17, 2018

(54) GEL FILLED PORT PRESSURE SENSOR FOR ROBUST MEDIA SEALING

(71) Applicant: Honeywell International Inc., Morris Plains, NJ (US)

(72) Inventors: Vishal Shalitkumar Kusanale, Kurundwad (IN); Palani Thanigachalam, Bangalore (IN); Todd Eckhardt, Westerville, OH (US); Lamar Floyd Ricks, Lewis Center, OH (US); Jim Cook, Columbus, OH (US); Pavan R. Kashyap, Bangalore (IN); Vignesh Murugesan, Madurai (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/293,043

(22) Filed: Oct. 13, 2016

(51) Int. Cl.
*G01L 7/00* (2006.01)
*G01L 19/06* (2006.01)
*G01L 7/08* (2006.01)

(52) U.S. Cl.
CPC ............ *G01L 19/0627* (2013.01); *G01L 7/08* (2013.01)

(58) Field of Classification Search
CPC ... H01L 27/14; G01L 9/06; G01L 9/00; G01L 7/00; G01L 7/08
See application file for complete search history.

(56) References Cited

U.S. PATENT DOCUMENTS

| | | | |
|---|---|---|---|
| 6,255,728 B1 | 7/2001 | Nasiri et al. | |
| 6,408,697 B1* | 6/2002 | Ootake | G01L 19/0038 73/706 |
| 6,550,337 B1* | 4/2003 | Wagner | G01L 9/0042 73/715 |
| 6,877,380 B2 | 4/2005 | Lewis | |
| 6,923,069 B1 | 8/2005 | Stewart | |
| 7,082,835 B2 | 8/2006 | Cook et al. | |
| 7,216,547 B1 | 5/2007 | Stewart et al. | |
| 7,458,274 B2 | 12/2008 | Lamb et al. | |
| 7,493,822 B2 | 2/2009 | Stewart et al. | |
| 7,503,221 B2* | 3/2009 | Wade | G01L 9/0051 73/721 |
| 7,647,835 B2* | 1/2010 | Speldrich | G01L 19/146 73/754 |
| 8,215,176 B2 | 7/2012 | Ding et al. | |
| 8,371,176 B2* | 2/2013 | Rozgo | G01L 19/0007 73/727 |
| 2003/0167851 A1 | 9/2003 | Parker | |
| 2007/0095144 A1 | 5/2007 | Oboodi et al. | |

(Continued)

*Primary Examiner* — Jewel V Dowtin

(57) ABSTRACT

Embodiments relate generally to methods and systems for detecting pressure. A pressure sensor assembly may comprise a sensor unit having a pressure input port on one side, the sensor unit comprising a printed circuit board; a pressure sensor secured to a side of the printed circuit board; a support secured to the side of the printed circuit board, the support circumferentially surrounding the pressure sensor and defining the pressure input port; and a media isolation layer comprising a first media isolation layer applied adjacent to the pressure sensor, and a second media isolation layer comprising a material different from the first media isolation layer located between the first media isolation layer and the pressure input port, wherein the media isolation layer is configured to transfer a pressure caused by a sense media to the pressure sensor.

20 Claims, 7 Drawing Sheets

(56) References Cited

U.S. PATENT DOCUMENTS

2010/0064818 A1 3/2010 Shubert
2010/0180688 A1 7/2010 Khemet et al.
2015/0247776 A1 9/2015 Wagner et al.

* cited by examiner

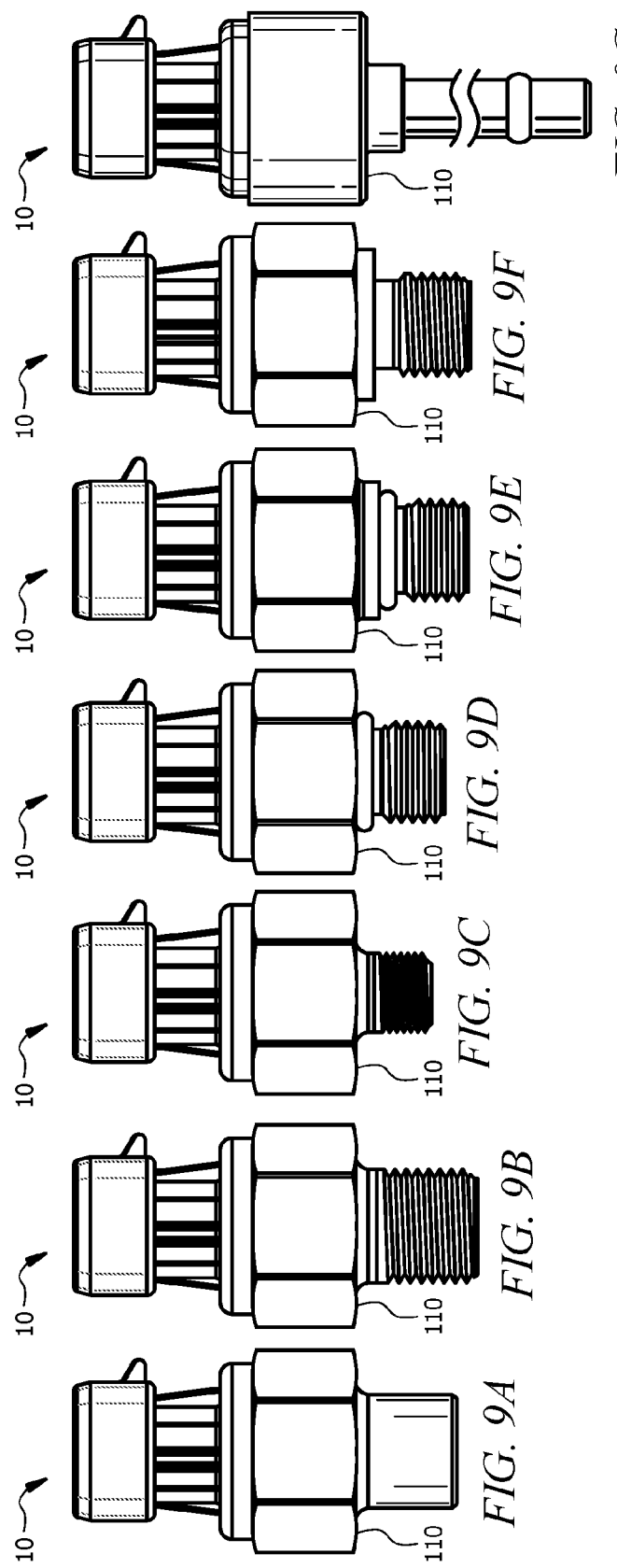

GEL FILLED PORT PRESSURE SENSOR FOR ROBUST MEDIA SEALING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Sensors are commonly used to sense environmental parameters such as pressure, temperature, humidity, flow, thermal conductivity, gas concentration, light, magnetic fields, electric fields, as well as many other environmental parameters. Such sensors are used in a wide variety of applications including, for example, medical applications, flight control applications, industrial process applications, combustion control applications, weather monitoring applications, water metering applications, as well as many other applications.

SUMMARY

In an embodiment, a pressure sensor assembly may comprise a sensor unit having a pressure input port on one side, the sensor unit comprising a printed circuit board; a pressure sensor secured to a side of the printed circuit board; a support secured to the side of the printed circuit board, the support circumferentially surrounding the pressure sensor and defining the pressure input port; and a media isolation layer comprising a first media isolation layer applied adjacent to the pressure sensor, and a second media isolation layer comprising a material different from the first media isolation layer located between the first media isolation layer and the pressure input port, wherein the media isolation layer is configured to transfer a pressure caused by a sense media to the pressure sensor.

In an embodiment, a pressure sensor assembly may comprise a sensor unit having a pressure input port on one side, the sensor unit comprising a printed circuit board; a pressure sensor secured to a side of the printed circuit board; a support secured to the side of the printed circuit board, the support circumferentially surrounding the pressure sensor and defining the pressure input port; and at least one media isolation layer contained by the support, the media isolation layer configured to transfer a pressure caused by a sense media to the pressure sensor.

In an embodiment, a method of sensing pressure may comprise applying pressure to a pressure port of a sensor assembly, the sensor assembly comprising a sensor unit having a pressure input port on one side, the sensor unit comprising a printed circuit board; a pressure sensor secured to a side of the printed circuit board; a support secured to the side of the printed circuit board, the support circumferentially surrounding the pressure sensor and defining the pressure input port; and a media isolation layer comprising a first media isolation layer applied adjacent to the pressure sensor, and a second media isolation layer comprising a material different from the first media isolation layer located between the first media isolation layer and the pressure input port; deflecting at least a portion of the pressure sensor with the applied pressure; measuring the deflection of the pressure sensor; and determining a magnitude of the applied pressure based on the measured deflection of the sensor.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 9A-9G illustrate exemplary configurations for the pressure port of a sensor assembly.

DETAILED DESCRIPTION

Figure 1:
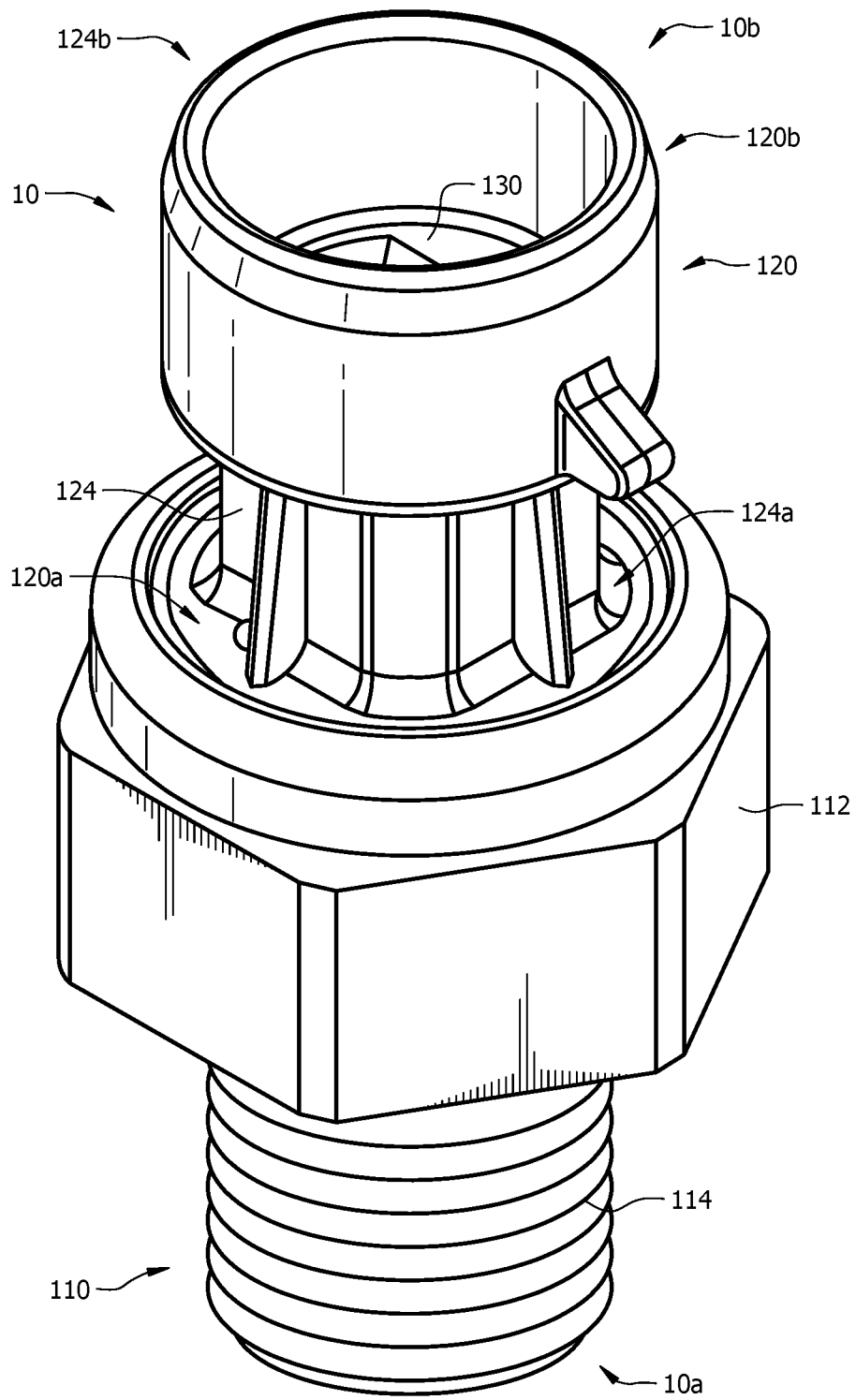
FIG. 1 is a perspective view of an illustrative sensor assembly.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might"

(or other such language) be included or have a characteristic, that particular component or feature is not required to be included or to have the characteristic. Such component or feature may be optionally included in some embodiments, or it may be excluded.

Embodiments of the disclosure include methods and systems for detecting pressure by a pressure sensor. An exemplary pressure sensor may comprise a sensor unit comprising a support and one or more media isolation layers located within the support. The support and media isolation layers may be positioned adjacent to a sensor element of the sensor unit.

Typical pressure sensors may employ one or more O-rings to seal sense media from the sensor. However, harsh or abrasive media may not be sealed well by an O-ring over a long use-life. Additionally, a variety of O-rings may be needed for different types of sense media, and therefore the variety of O-rings should be stocked in a factory, increasing inventory.

Embodiments of the disclosure may comprise sensor units comprising minimal sealing solutions configured to provide a seal for a wide variety of sense media applications. Examples of sealing solutions may comprise epoxy adhesives and/or welding methods. A support (which may be a metal and/or plastic ring) may provide sealing via the adhesive for a variety of sense media.

A sensor may be attached to a printed circuit board (PCB) with a support filled with a first media isolation layer (which may comprise a soft gel). Additionally, to provide increased media resistance, a second media isolation layer (of gel) can be applied over the first media isolation layer (wherein the second media isolation layer may provide chemical resistance, abrasive resistance, or another type of resistance). For example, a diesel or lubricant media may be sealed by using a corresponding gel, such as fluorosilicone material.

Referring to the figures, and in one illustrative embodiment, a sensor assembly 10 may include a sensor unit 20 having a first side 20*a* and a second side 20*b*, a pressure port 110 on the first side 20*a* of the sensor unit 20, and an electrical connector 120 on the second side 20*b* of the sensor unit 20, as best depicted in FIGS. 1-7. In some instances, pressure port 110 may be mechanically connected to sensor unit 20. At a first end 120*a*, electrical connector 120 may be mechanically and electrically connected to sensor unit 20, and at a second end 120*b*, the electrical connector 120 may mechanically and electrically connect to a cable harness or other device (not shown) that is configured to receive an output of the sensor unit 20.

It is contemplated that sensor assembly 10 may be any suitable type of sensor assembly. For example, sensor assembly 10 may be a pressure sensor assembly, a humidity sensor assembly, a force sensor assembly, a pressure switch assembly, a light sensor assembly, a gas concentration sensor assembly, a magnetic or electrical field sensor assembly, a conductivity sensor assembly, or another other suitable sensor assembly.

Figure 2:
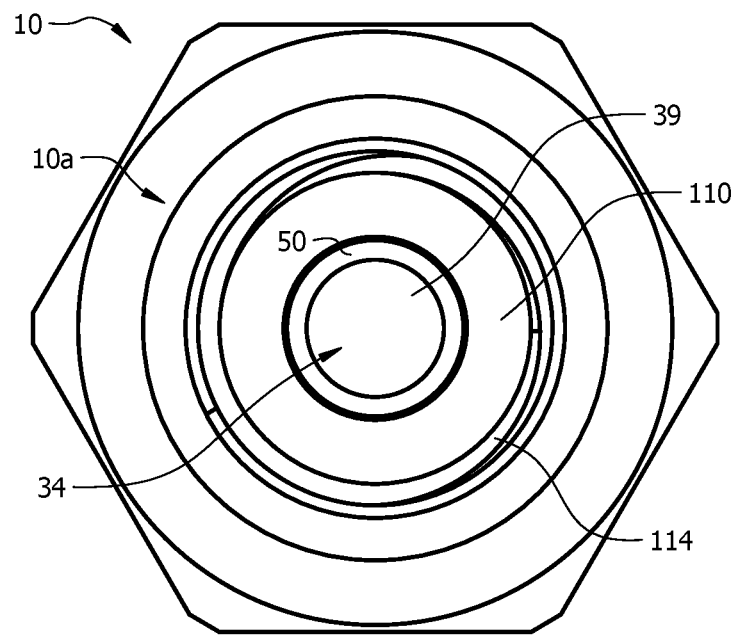
FIG. 2 is a view of the illustrative sensor assembly of FIG. 1 viewed from a pressure port side of the sensor assembly.
Figure 3:
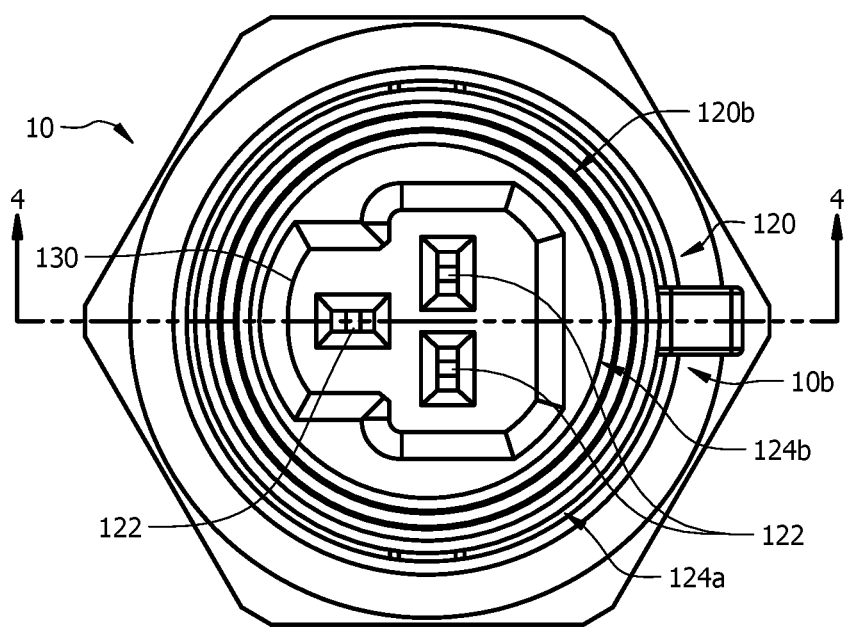
FIG. 3 is a view of the illustrative sensor assembly of FIG. 1 viewed from an electrical connector side of the sensor assembly.

FIGS. 2 and 3 depict a first end 10*a* and a second end 10*b* of the sensor assembly 10. The first end 10*a* of the sensor assembly 10 (shown in FIG. 2) may be configured to be mechanically connectable to a device having a media to be measured. The second end 10*b* of the sensor assembly 10 (shown in FIG. 3) may be configured to be mechanically and electrically connected to a device configured to receive an output of the sensor unit 20.

Figure 4:
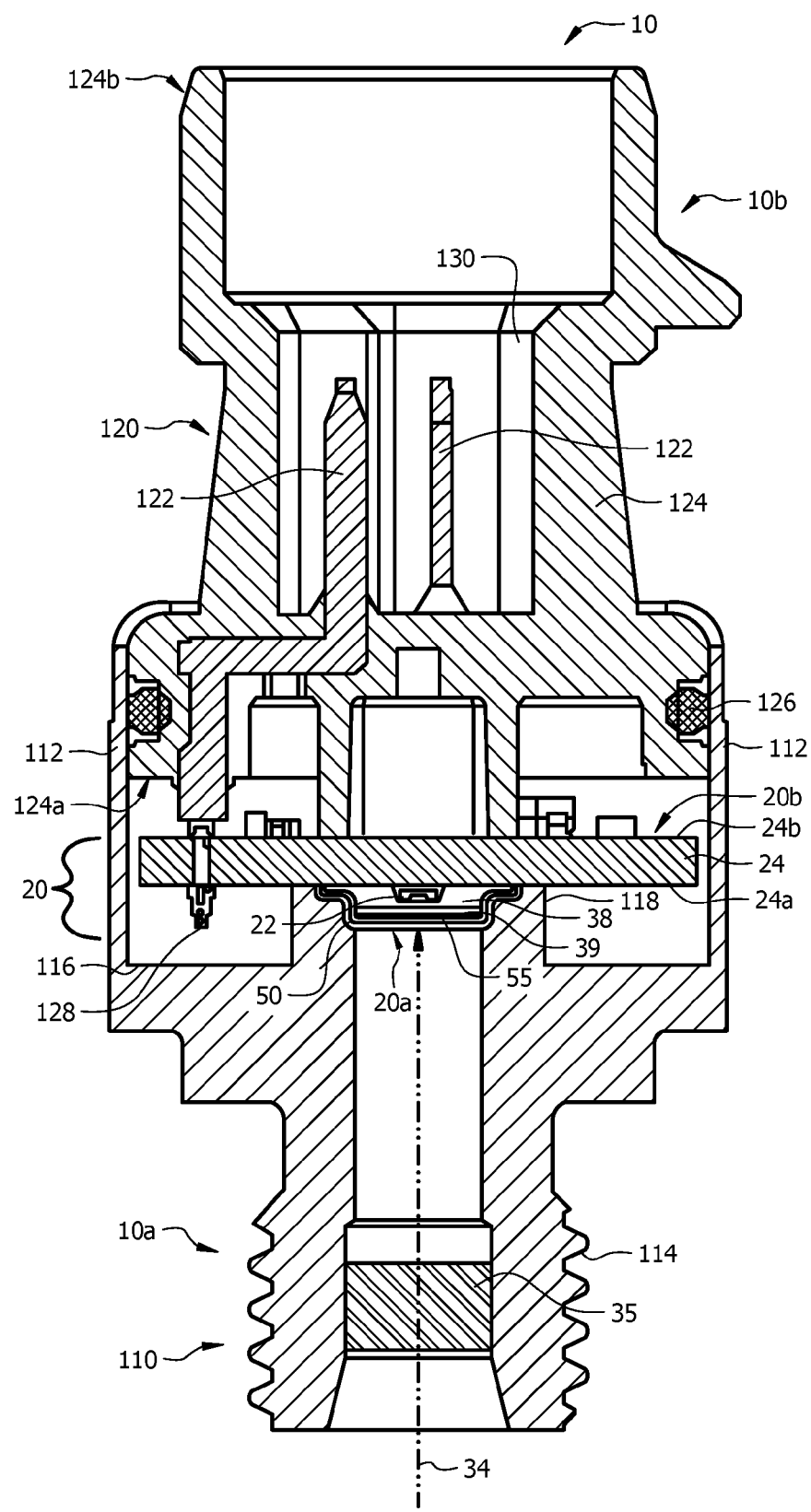
FIG. 4 is a cross-sectional view of the illustrative sensor assembly of FIG. 1, taken along line 4-4 in FIG. 3.

As best shown in FIGS. 2 and 4, the pressure port 110 of the sensor assembly 10 may at least partially define a fluid path 34 that extends from an external side of the pressure port 110 to an internal side of the pressure port (e.g. to a media isolation layer 39 of the sensor unit 20), where one or more media isolation layers 38, 39 may cover or encase the sensor 22 within a support 50 of the sensor unit 20 (as shown in FIG. 4, for example). The support 50 may form a pressure input port 55 of the sensor unit 20, allowing the fluid path 34 to apply pressure to the media isolation layers 38, 39 and therefore the sensor 22.

In some cases, the pressure port 110 may include threads 114 and/or other connecting configuration for mechanically connecting the pressure port 110 and/or the sensor assembly 10 to one or more device having a fluid to be measured. Although pressure port 110 may be depicted as having a male-type connector, the pressure port may be configured with a female-type connector with threads or other connector configuration on an interior surface of the pressure port 110.

In some embodiments, the sensor assembly 10 may also comprise a snubber 35 located within the pressure port 110. The snubber 35 can be fitted within the fluid path 34 to protect the sensor unit 20 from large pressure spikes or variations, which may extend the use-life of the sensor unit 20.

As best shown in FIGS. 1 and 3, the electrical connector 120 may have an electrical connector body 124 (e.g., a housing) with a first end 124*a* and a second end 124*b*, a mechanical connector 130, and one or more electrical terminals 122. In one example, one or more of the electrical terminals 122 may be exposed at first end 124*a* of electrical connector body 124, and one or more of the electrical terminals 122 may be exposed at second end 124*b* of electrical connector body 124.

FIG. 4 depicts a cross-section of the sensor assembly 10 taken along line 4-4 in FIG. 3. As shown in FIG. 4, the pressure port 110 may include walls 112 that extend around the sensor unit 20 and the first end 124*a* of the electrical connector body 124. Alternatively, or in addition, the sensor assembly 10 may include walls and/or a housing separate from the pressure port 110 that may surround and/or mechanically connect to one or more of the electrical connector 120, the sensor unit 20, and the pressure port 110.

The pressure port 110 and/or the walls 112 may be made out of any material. For example, the pressure port 110 and/or the walls 112 may be made out of brass, aluminum, stainless steel, plastic, or any other suitable material. In some cases, at least a portion of the pressure port 110 may have a textured surface or non-textured surface, where the textured surface may facilitate adhering pressure port 110 to another surface and may be formed from one or more processes including, for example, an abrasive etch, grit blasting, a chemical etch, a laser etch, machining, and/or any other suitable texturing technique. In one example, the support 50 may be secured to or secured relative to an internal side of the pressure port 110 (e.g., to or relative to a shoulder or other portion of the internal side of the pressure port 110) such that the fluid path 34 of the pressure port 110 is in fluid communication with the media isolation layers 38, 39.

The sensor unit 20 may rest against the pressure port 110, as shown in FIG. 4. In some cases, the pressure port 110 may include an indent or an indent/recess 116, as well as one or more raised portions 118.

As best shown in FIG. 4, the sensor unit 20 may include a thick film printed ceramic or a printed circuit board (PCB) 24 (e.g., a PCB made, at least in part, of FR4 laminate and/or other material), a sensor 22 (e.g., a pressure sensor with a pressure sense element, or other sensor having a sense element) connected to the PCB, one or more media isolation layers 38, 39, and a support 50. The sensor 22 may be back-side mounted on a first side 24a of the PCB 24 and may be configured to perform top-side (of the sense die) sensing. In a pressure sensor, top-side sensing may be when a sensed media either directly or indirectly (e.g., through a media isolation layer or other intermediary) interacts with a top-side of a sensor 22, where a back- or bottom-side of the sensor 22 is etched inward toward the top-side to form a sensing diaphragm. The media isolation layers 38, 39 may cover or substantially cover the sensor 22 such that media in the fluid path 34 does not directly contact the sensor 22 itself.

The support 50 may entirely, or at least partially, extend around the media isolation layers 38, 39 and may be connected to the first side 24a of the PCB 24. The support 50 may be made from any type of material. In one example, the support 50 may be made from a plastic, a metal, a ceramic, and/or any other suitable material.

Back-side mounting the sensor 22 to the first side 24a of the PCB 24 may facilitate creating a robust sensor unit 20, where the first side 24a (e.g., front side) may be facing the fluid path 34. In one example, back-side mounting the sensor 22 to the first side 24a of the PCB 24 may create a more robust sensor unit 20 because any sensed media acting on the sensor 22 acts to push the sensor 22 against the PCB 24. Additionally, such a configuration may allow for a smaller sensor 22 when compared to sensor units in which a sensor 22 is mounted to a second side of the PCB 24 that faces away from the fluid path. Such a smaller sensor 22 may be possible, at least in part, because less sense element surface area is needed to attached the sensor 22 to PCB 24 when the sense element is connected to a first side 24a of the PCB 24 facing the fluid path due to forces from the fluid path 34 pushing the sense element into the PCB 24 instead of pushing the sense element away from the PCB 24.

Although the sensor 22 may be described herein as being back-side mounted to the first side 24a of the PCB 24, it is contemplated that the sensor 22 may be mounted relative to the PCB 24 in one or more other configurations. For example, the sensor 22 may be mounted to the second side 24b of the PCB 24. Also, the sensor 22 may be front side mounted and/or the sensor 22 may be mounted in any other suitable manner.

The sensor 22 may be electrically connected to PCB 24 in any manner. In one example, the sensor 22 may be electrically connected to the PCB 24 via wire bonds, bump bonds, and/or in any other suitable manner.

When the sensor 22 is configured to sense a pressure in the fluid path 34, the sensor 22 may be arranged to sense an absolute pressure, as shown in FIG. 4, where there may be a vacuum on the back side of the sensor 22 (e.g. between the sensor 22 and the PCB 24). Alternatively, the sensor 22 may be configured in the sensor unit 20 as a gage pressure sensor, where a pressure of sensed media in the fluid path 34 is referenced against an atmospheric pressure or other reference pressure. In such a gage pressure sensor, the PCB 24 may include an opening extending through the PCB 24 (e.g., extending through the PCB 24 from the first side 24a to the second side 24b of the PCB 24) to allow a reference pressure to reach the back side of the sensor 22. Example sensors may include, but are not limited to, those described in U.S. Pat. Nos. 7,503,221; 7,493,822; 7,216,547; 7,082,835; 6,923,069; 6,877,380, and U.S. patent application publications: 2010/0180688; 2010/0064818; 2007/0095144; and 2003/0167851, all of which are hereby incorporated by reference.

The media isolation layers 38, 39 may be any type of material configured to transfer a pressure or changes in pressure caused by a sense media in the fluid path 34 to the sensor 22, while providing a barrier between the sensor 22 and the media in the fluid path 34. In one example, the media isolation layers 38, 39 may be a gel material layer (e.g., a non-compressible material) or other material. In the example shown, the sensor 22 and/or the media isolation layers 38, 39 may be surrounded by the support 50. The support 50 may be connect to the PCB 24 and provide support to the PCB 24 while maintaining the media isolation layers 38, 39 in a position over the sensor 22.

The electrical connector 120 and/or the pressure port 110 may mechanically and/or electrically connect to the sensor unit 20. In one example, as best shown in FIG. 4, the electrical connector body 124 of the electrical connector 120 may abut the second side 24b of the PCB 24. Additionally, the raised portion 118 of the pressure port 110 may abut the first side 24a of the PCB 24 and/or the support 50. In the example shown, the electrical connector body 124 may provide support to the PCB 24 against forces produced by the media in the fluid path 34 acting upon the sensor 22 and PCB 24. As shown in FIG. 4, the support from the electrical connector body 124 on the second side 24b of the PCB 24 may align with support on the first side 24a of the PCB 24 from the support 50 and/or raised portion 118 of the pressure port 110, such that the PCB 24 may be sandwiched between the electrical connector body 124 and the support 50 and/or raised portion 118. This configuration may help support the PCB 24 and reduce stress at the sensor 22. It is contemplated that the support acting on the PCB 24 may be sufficient such that a pressure source exerting a pressure of 1, 2, 4, 8, 10, 20, 40, 50, 100, 1000, 2000, 5000 PSI or more on the sensor 22 and/or PCB 24 does not affect the accuracy of the output of the sensor assembly 10, by, for example more than 0.01 percent, 0.1 percent, 1 percent, 5 percent, 10 percent or more, as desired.

Illustratively, the support applied to the PCB 24 by the electrical connector 120, pressure port 110, and/or the support 50 may be configured or shaped to distribute forces that may be applied to PCB 24 such that the PCB 24 may remain sufficiently flat so as to cause less than a particular percentage error in the output of sensor 22 when a pressure is applied to the sensor 22. The particular percentage error may be ten percent (%) or less error in the output of sensor 22, or another desirable limit of error including, but not limited to, less than 0.001%, 0.01%, 0.1%, 1.0%, 2.0%, 5.0%, 10.0%, or 20.0%.

In the example shown, the walls 112 of the pressure port 110 may receive the electrical connector 120. An O-ring 126 may be received in and/or at the first end 124a of the electrical connector body 124 to create a seal between the electrical connector body 124 and the walls 112 of the pressure port 110. In some cases, to create a mechanical connection between the pressure port 110, the sensor unit 20, and the electrical connector 120, the walls 112 of the pressure port may be formed (e.g., bent, crimped, etc.) around the electrical connector body 124 of the electrical connector 120. Such forming of the walls 112 may compress the O-ring 126 to create environmental and pneumatic seals in the sensor assembly 10.

Figure 5:
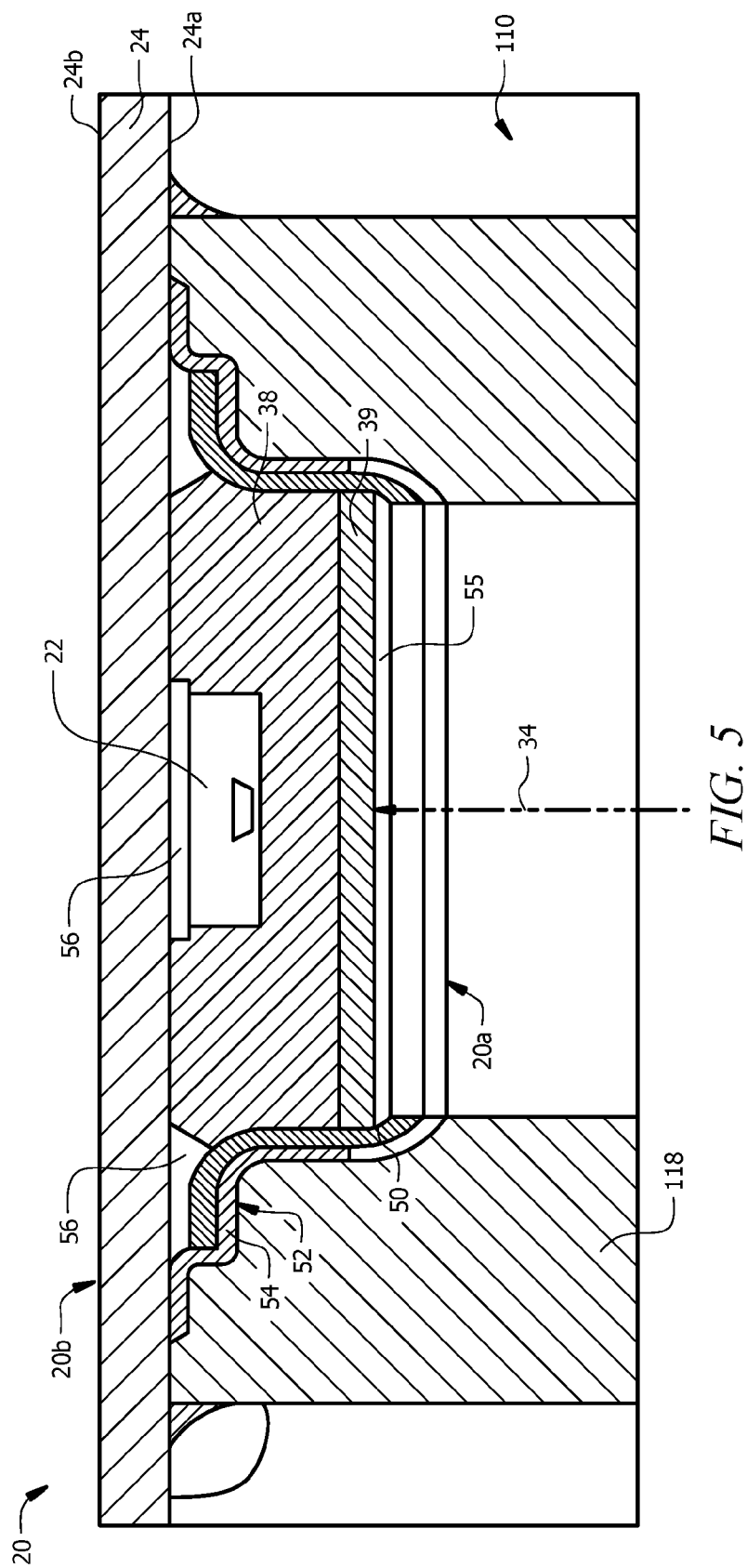
FIG. 5 is a detailed view of a portion of the sensor assembly shown in FIG. 4.

FIG. 5 is a detailed view of the sensor unit 20. As shown in FIG. 5, the sensor unit 20 may comprise the PCB 24, sensor 22, media isolation layers 38 and 39, and support 50 (as described above). The sensor 22 may be directly attached to the PCB 24 via adhesive 56. The first media isolation layer 38 may be directly attached to the PCB 24 over the sensor 22. The support 50 may also be directly attached to the PCB 24, via one or more layers of adhesive 56. The sensor unit 20 may in some embodiments comprise a second media isolation layer 39, which may be applied over the first media isolation layer 38. The second media isolation layer 39 may comprise a suitable material for blocking media from entering the sensor unit 20, wherein the second media isolation layer 39 may be chosen based on the application and use of the sensor assembly 10.

In some embodiments, the sensor unit 20 may not comprise an O-ring within the sensor unit 20. The absence of an O-ring within the sensor unit 20 may simplify the manufacturing process of the sensor unit 20 (and therefore the sensor assembly 10) and may allow for more precise spacing between the elements of the sensor unit 20 and the sensor assembly 10 as a whole. Additionally, the thickness of the media isolation layers 38 and 39 may be more precisely controlled without an O-ring. Additionally, harsh or abrasive sense media may penetrate the seal with an O-ring, and the O-ring compression may set at higher temperatures, causing leakage over a period of time. Therefore, the media isolation layers 38, 39 and support 50 may be used without an O-ring.

The support 50 may comprise an opening exposing the second media isolation layer 39 (and/or the first media isolation layer 38) to the fluid path 34. In some embodiments, the support 50 may be attached to the raised portion 118 of the pressure port 110 using one or more layers of adhesive 54 between the support 50 and a shaped surface 52 of the raised portion 118.

Figure 6:
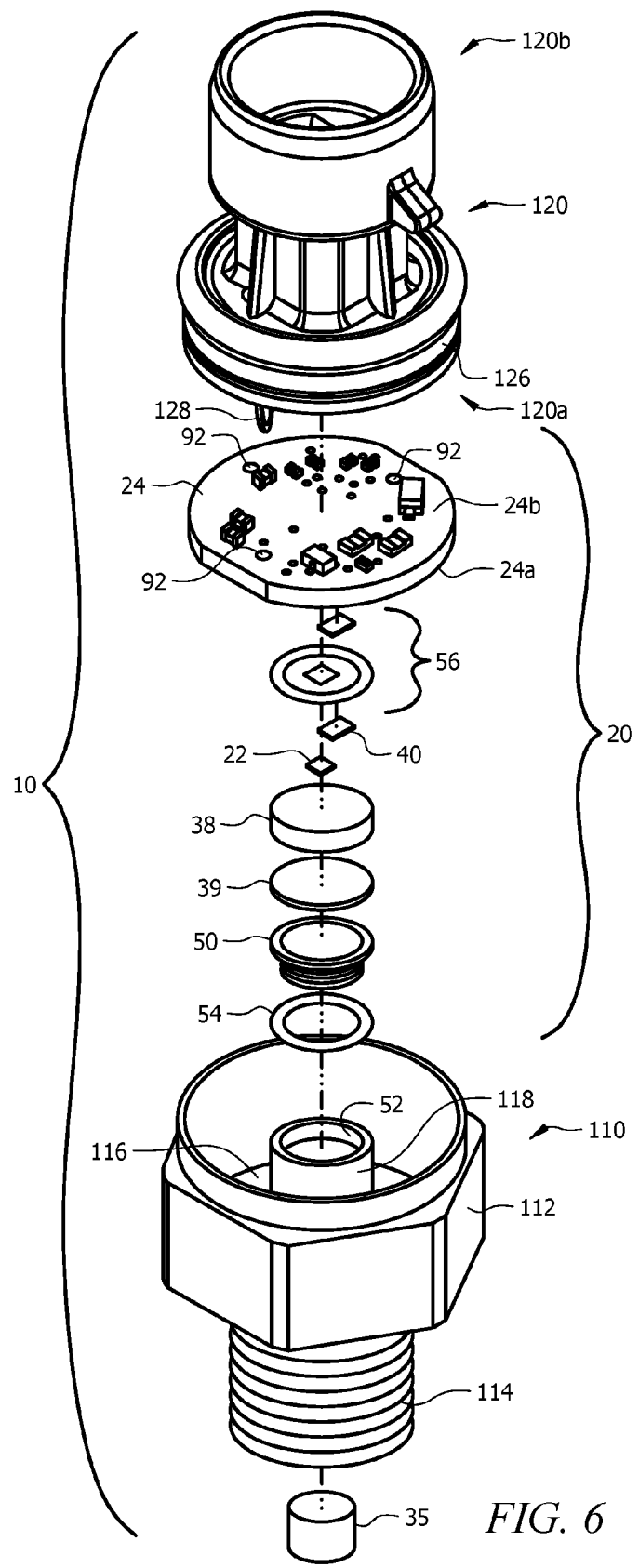
FIG. 6 is an exploded perspective view of the illustrative sensor assembly of FIG. 1.

FIG. 6 is an exploded perspective view of the sensor assembly 10. As is shown in FIG. 6, the sensor 22 may include an application specific integrated circuit (ASIC) 40. The ASIC 40 may be attached to the first side 24a of the PCB 24. The ASIC 40 may be electrically connected to the PCB 24 via wire bonds, bump bonds, electrical terminals, and/or any other suitable electrical connections.

In some cases, an attach or adhesive 56 may be used to mechanically and/or electrically connect one or more of the sensor 22, the support 50, and/or the ASIC 40 to the first side 24a of the PCB 24. The adhesives 56 and 54 described herein may be a single piece or layer of adhesive, or may include two or more pieces or layers of adhesive. Adhesive layer 56 may be any adhesive capable of facilitating assembly of sensor assembly 10, such as an epoxy adhesive or other similar or different adhesives. Illustrative example adhesives may include, but are not limited to, an adhesive having the ingredients of at least Bisphenol-A type epoxy resin, Diglycidyl ether of neopentyl glycol, cycloaliphatic/aliphatic amine, aluminum oxide, carbon black, and amorphous silicon dioxide; an adhesive having the ingredients of epoxy phenol novalac (25%-50% by weight), aluminum powder (10%-25% by weight), flexibilizer epoxy resin (10%-25% by weight), curing agent (2.5%-10% by weight), siloxane treated silicon dioxide (2.5%-10% by weight), silicon dioxide, chemically prepared (≤2.5% by weight), and curing agent (≤2.5% by weight); and an adhesive having the ingredients of epoxy resin (70%-90% by weight), non-volatile amide (10%-30% by weight) and amorphous silica (1%-5% by weight), or other suitable adhesives as desired.

In some embodiments, the support 50 may comprise a metal material, plastic material, [other material examples]. The support 50 may be configured to form a secure vertical connection with the pressure port 110 via the layer(s) of adhesive 54. The adhesive configuration may provide a strong shear adhesive joint, increasing the strength of the sensor assembly 10 to withstand high burst pressures. The adhesive layers 54 and 56 may be chosen to withstand variations in temperature and pressure, as well as variations in media entering the pressure port 110.

The sensor assembly 10 may also comprise the snubber 35 located within the pressure port 110. The snubber 35 can be fitted within the fluid path to protect the sensor unit 20 from large pressure spikes or variations, which may extend the use-life of the sensor unit 20.

Figure 8:
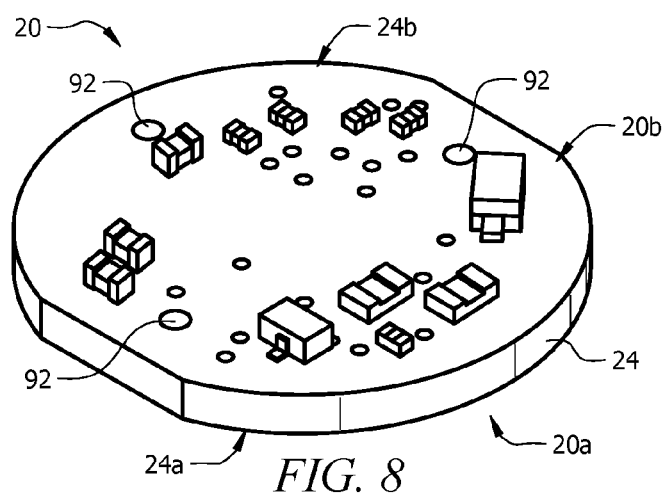
FIG. 8 illustrates a perspective view of an illustrative sensor unit.

The PCB 24 may include one or more processing electronics and/or compensation circuitry connected to or on the second side 24b of the PCB 24, as best shown in FIGS. 6 and 8. Such processing electronics may be electrically connected to the sensor 22 and/or electrical terminals 92 to process electrical signals from the sensor 22 and/or to transfer outputs from the sensor 22 to electrical terminals 122 (shown in FIG. 4) of the electrical connector 120.

In some instances, the PCB 24 may include circuitry that may be configured to format the one or more output signals provided by the sensor 22 into a particular output format. For example, circuitry of the PCB 24 (e.g., circuitry on one or more of the first side 24a and the second side 24b of the PCB 24) may be configured to format the output signal provided by sensor 22 into a ratio-metric output format, a current format, a digital output format, and/or any other suitable format. In some cases, the circuitry of the PCB 24 may be configured to regulate an output voltage. Circuitry on the PCB 24 for providing a ratio-metric (or other) output may include traces and/or other circuitry that may serve as a conduit to test pads and/or for providing the ratio-metric (or other) output to electrical connector 120, where the circuitry does not necessarily reformat the output.

In some cases, the electrical connector 120 may include one or more connectors 128 (e.g., compliant pins, solder pins (e.g., with a thick film printed ceramic or in other instances), and/or other connectors) configured to mechanically and/or electrically engage the PCB 24. Connectors 128 may be connected to the electrical connector body 124 in any manner; for example, connectors 128 may be insert molded in the electrical connector body 124. The one or more connectors 128 may include a compliant pin that may be configured to mechanically engage and electrically connect to an electrical terminal 92 of the PCB 24. Compliant pins are discussed in greater depth in U.S. Pat. No. 7,458,274, issued on Dec. 2, 2008 to Lamb et al. and titled "Pressure Sensor Incorporating a Compliant Pin" which is hereby fully incorporated by reference.

Figure 7:
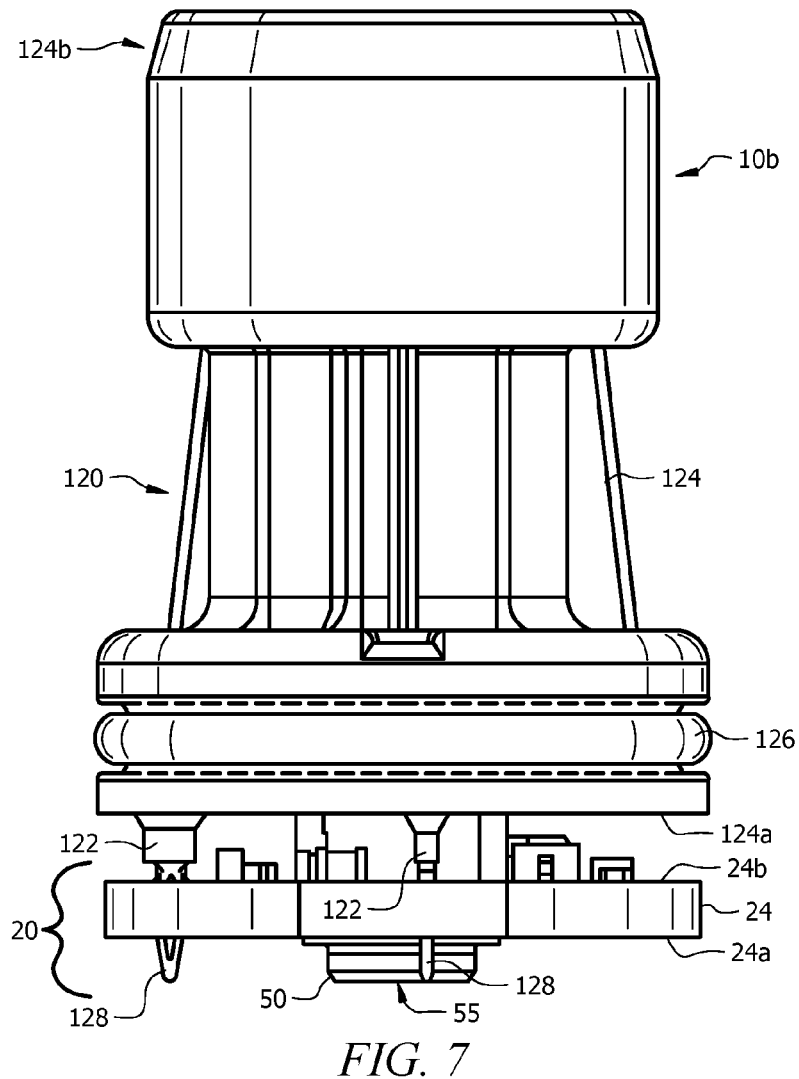
FIG. 7 is a perspective view of a portion of the sensor assembly of FIG. 1.

FIG. 7 depicts a view of the sensor unit 20 and the electrical connector 120 (without the pressure port 110 attached to the assembly). The PCB 24 of the sensor unit 20 is shown attached to the one or more electrical terminals 122 (via the one or more connectors 128).

FIG. 8 is a perspective view of the PCB 24, showing the second side 24b of the PCB 24. The PCB 24 may comprise any number of elements attached to the second side 24b. In some embodiments, the PCB 24 may comprise electrical terminals 92 configured to receive the connectors 128, to mechanically and electrically connect the electrical connector 120 to the PCB 24.

Once the sensor unit 20 has been fabricated, the sensor unit 20 may be calibrated and/or compensated prior to further assembly into the sensor assembly 10. Alternatively, or in addition, the sensor unit 20 may be calibrated and/or compensated after assembly into the sensor assembly 10.

As described above, the sensor unit 20 of the sensor assembly 10 may be configured to determine pressure from a sense media, wherein the sense media may enter the pressure port 110 via the fluid path 34. The sense media may enter the sensor unit 20 via a pressure input port 55 of the support 50, and the sense media may contact the second media isolation layer 39, thereby compressing the media isolation layer 39 and the first media isolation layer 38. The compression of the media isolation layers 38 and 39 may deflect at least a portion (such as a diaphragm or other sense element) of the sensor 22. The sensor 22 may be configured to determine a pressure associated with the deflection of the sensor 22. The pressure port 110 may be configured to supply the sense media to the sensor unit 20. The electrical connector 120 may be configured to electrically connect with the sensor unit 20 to receive the determined pressure from the sensor unit 20. The electrical connector 120 may also connect the sensor unit 20 to another device configured to receive the determined pressure.

The sensor assembly 10 may be assembled in one or more exemplary methods. One method begins by providing a PCB 24. Adhesive 56 may be applied to the first side 24a of the PCB 24. The sensor 22 may be placed on an associated piece of adhesive 56, the ASIC 40 may be placed on an associated piece of adhesive 56, and the support 50 may be placed on an associated piece of adhesive 56. After placing the sensor 22, the ASIC 40, and the support 50 on the adhesive(s) 56, the adhesive(s) 56 may be cured. The sensor 22, the ASIC 40, and/or other electronic components may then be wire bonded or otherwise electrically connected to the PCB 24. A first media isolation layer 38 may then be applied to the sensor 22 and the PCB 24 through a pressure input port 55 in the support 50, where the support 50 may circumferentially or substantially circumferentially surround the sensor 22 (e.g., in such cases, the support 50 may be a ring or a gel ring supporting the media isolation layer 38 covering the sensor 22). Once applied, the media isolation layer 38 may be cured. In some cases, the media isolation layer 38 may be cured by applying a vacuum and/or applying a specific temperature to the media isolation layer 38. In some embodiments, a second media isolation layer 39 may be applied over the first media isolation layer 38 through the pressure input port 55 in the support 50, where the support 50 may circumferentially or substantially circumferentially surround the sensor 22 and media isolation layers 38 and 39. Once applied, the media isolation layer 39 may be cured. In some cases, the media isolation layer 39 may be cured by applying a vacuum and/or applying a specific temperature to the media isolation layer 39. In some embodiments, the first media isolation layer 38 and the second media isolation layer 39 may be cured separately. In some embodiments, the first media isolation layer 38 and the second media isolation layer 39 may be cured (at least partially) at the same time. Application and curing of the media isolation layers may form the sensor unit 20. In some cases, the sensor unit 20 may be calibrated over pressure at this stage, although this is not required.

The electrical connector 120 may be prepped for connection to the sensor unit 20 by loading the O-ring 126 onto the electrical connector body 124. The electrical connector 120 may be connected to the sensor unit 20 by placing the connectors 128 into openings of electrical terminals 92 of the PCB 24 to mechanically and electrically connect the electrical connector 120 to the PCB 24. The electrical connector 120 and the sensor unit 20 may then be inserted into the pressure port 110. The raised portions 118 of the pressure port 110 may be coated with adhesive 54, the support 50 may be placed on the adhesive 54, and the adhesive 54 may be cured. Once the connected electrical connector 120 and the sensor unit 20 are inserted into the pressure port 110, the walls 112 may be formed (e.g., bent, crimped, etc.) around the electrical connector 120 to form the sensor assembly 10.

FIGS. 9A-9G illustrate exemplary sensor assemblies 10, wherein the pressure port 110 of the sensor assembly 10 may comprise one of many variations in connector type. FIG. 9A illustrates a 7/16-20 Female Schrader with deflator. FIG. 9B illustrates a ¼-18 NPT. FIG. 9C illustrates a ⅛-27 NPT. FIG. 9D illustrates a G ¼ BSPP (ISO 228-1). FIG. 9E illustrates a M12×1.5 (ISO 6149-3). FIG. 9F illustrates an ISO 1179-2, G ¼ A-L. FIG. 9G illustrates a ¼-inch OD copper tube.

In a first embodiment, a pressure sensor assembly may comprise a sensor unit having a pressure input port on one side, the sensor unit comprising a printed circuit board; a pressure sensor secured to a side of the printed circuit board; a support secured to the side of the printed circuit board, the support circumferentially surrounding the pressure sensor and defining the pressure input port; and a media isolation layer comprising a first media isolation layer applied adjacent to the pressure sensor, and a second media isolation layer comprising a material different from the first media isolation layer located between the first media isolation layer and the pressure input port, wherein the media isolation layer is configured to transfer a pressure caused by a sense media to the pressure sensor.

A second embodiment can include the pressure sensor assembly of the first embodiment, wherein the first media isolation layer comprises a first gel material, and wherein the second media isolation layer comprises a second gel material.

A third embodiment can include the pressure sensor assembly of the first or second embodiments, wherein the second media isolation layer comprises a chemically resistant gel material.

A fourth embodiment can include the pressure sensor assembly of any of the first to third embodiments, wherein the media isolation layer is contained by the support.

A fifth embodiment can include the pressure sensor assembly of any of the first to fourth embodiments, further comprising a pressure port having a fluid path that extends from an external side of the pressure port to the pressure input port, wherein the support is secured relative to the pressure port such that the fluid path of the pressure port is in fluid communication with the media isolation layer.

A sixth embodiment can include the pressure sensor assembly of the fifth embodiment, wherein the support is secured to a raised portion of the pressure port via adhesive.

A seventh embodiment can include the pressure sensor assembly of the fifth or sixth embodiments, further comprising a snubber located within the fluid path of the pressure port.

An eighth embodiment can include the pressure sensor assembly of any of the first to seventh embodiments, further comprising an electrical connector including one or more electrical terminals, wherein at least one of the one or more electrical terminals are electrically connected to an output of the sensor unit.

A ninth embodiment can include the pressure sensor assembly of any of the first to eighth embodiments, wherein the support comprises a metal ring.

A tenth embodiment can include the pressure sensor assembly of any of the first to ninth embodiments, wherein the support comprises a plastic ring.

In an eleventh embodiment, a pressure sensor assembly may comprise a sensor unit having a pressure input port on one side, the sensor unit comprising a printed circuit board;

a pressure sensor secured to a side of the printed circuit board; a support secured to the side of the printed circuit board, the support circumferentially surrounding the pressure sensor and defining the pressure input port; and at least one media isolation layer contained by the support, the media isolation layer configured to transfer a pressure caused by a sense media to the pressure sensor.

A twelfth embodiment can include the pressure sensor assembly of the eleventh embodiment, wherein the at least one media isolation layer comprises a first media isolation layer applied adjacent to the pressure sensor, and a second media isolation layer comprising a material different from the first media isolation layer located between the first media isolation layer and the pressure input port.

A thirteenth embodiment can include the pressure sensor assembly of the twelfth embodiment, wherein the second media isolation layer comprises a chemically resistant gel material.

A fourteenth embodiment can include the pressure sensor assembly of any of the eleventh to thirteenth embodiments, further comprising a pressure port having a fluid path that extends from an external side of the pressure port to the pressure input port, wherein the support is secured relative to the pressure port such that the fluid path of the pressure port is in fluid communication with the at least one media isolation layer.

A fifteenth embodiment can include the pressure sensor assembly of any of the eleventh to fourteenth embodiments, wherein the circumference of the support is less than the circumference of the printed circuit board.

A sixteenth embodiment can include the pressure sensor assembly of any of the eleventh to fifteenth embodiments, wherein the support comprises a lip configured to be secured to the printed circuit board via adhesive.

A seventeenth embodiment can include the pressure sensor assembly of any of the eleventh to sixteenth embodiments, further comprising an electrical connector including one or more electrical terminals, wherein at least one of the one or more electrical terminals are electrically connected to an output of the sensor unit.

In an eighteenth embodiment, a method of sensing pressure may comprise applying pressure to a pressure port of a sensor assembly, the sensor assembly comprising a sensor unit having a pressure input port on one side, the sensor unit comprising a printed circuit board; a pressure sensor secured to a side of the printed circuit board; a support secured to the side of the printed circuit board, the support circumferentially surrounding the pressure sensor and defining the pressure input port; and a media isolation layer comprising a first media isolation layer applied adjacent to the pressure sensor, and a second media isolation layer comprising a material different from the first media isolation layer located between the first media isolation layer and the pressure input port; deflecting at least a portion of the pressure sensor with the applied pressure; measuring the deflection of the pressure sensor; and determining a magnitude of the applied pressure based on the measured deflection of the sensor.

A nineteenth embodiment can include the method of the eighteenth embodiment, wherein deflecting at least a portion of the pressure sensor comprises compressing the first media isolation layer and the second media isolation layer.

A twentieth embodiment can include the method of the eighteenth or nineteenth embodiments, further comprising electrically communicating the determined magnitude of the applied pressure via an electrical connector.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A pressure sensor assembly comprising:
   a sensor unit having a pressure input port on one side, the sensor unit comprising:
   a printed circuit board;
   a pressure sensor secured to a side of the printed circuit board;
   a support secured to the side of the printed circuit board, the support circumferentially surrounding the pressure sensor and defining the pressure input port; and
   a media isolation layer comprising a first media isolation layer applied adjacent to the pressure sensor, and a second media isolation layer comprising a material different from the first media isolation layer located between the first media isolation layer and the pressure input port, wherein the media isolation layer is configured to transfer a pressure caused by a sense media to the pressure sensor.

2. The pressure sensor assembly of claim 1, wherein the first media isolation layer comprises a first gel material, and wherein the second media isolation layer comprises a second gel material.

3. The pressure sensor assembly of claim 1, wherein the second media isolation layer comprises a chemically resistant gel material.

4. The pressure sensor assembly of claim 1, wherein the media isolation layer is contained by the support.

5. The pressure sensor assembly of claim 1, further comprising a pressure port having a fluid path that extends from an external side of the pressure port to the pressure input port, wherein the support is secured relative to the pressure port such that the fluid path of the pressure port is in fluid communication with the media isolation layer.

6. The pressure sensor assembly of claim 5, wherein the support is secured to a raised portion of the pressure port via adhesive.

7. The pressure sensor assembly of claim 5, further comprising a snubber located within the fluid path of the pressure port.

8. The pressure sensor assembly of claim 1, further comprising an electrical connector including one or more electrical terminals, wherein at least one of the one or more electrical terminals are electrically connected to an output of the sensor unit.

9. The pressure sensor assembly of claim 1, wherein the support comprises a metal ring.

10. The pressure sensor assembly of claim 1, wherein the support comprises a plastic ring.

11. A pressure sensor assembly comprising:
    a sensor unit having a pressure input port on one side, the sensor unit comprising:
    a printed circuit board;
    a pressure sensor secured to a side of the printed circuit board;
    a support secured to the side of the printed circuit board, the support circumferentially surrounding the pressure sensor and defining the pressure input port; and
    at least one media isolation layer contained by the support, the media isolation layer configured to transfer a pressure caused by a sense media to the pressure sensor.

12. The pressure sensor assembly of claim 11, wherein the at least one media isolation layer comprises a first media isolation layer applied adjacent to the pressure sensor, and a second media isolation layer comprising a material different from the first media isolation layer located between the first media isolation layer and the pressure input port.

13. The pressure sensor assembly of claim 12, wherein the second media isolation layer comprises a chemically resistant gel material.

14. The pressure sensor assembly of claim 11, further comprising a pressure port having a fluid path that extends from an external side of the pressure port to the pressure input port, wherein the support is secured relative to the pressure port such that the fluid path of the pressure port is in fluid communication with the at least one media isolation layer.

15. The pressure sensor assembly of claim 11, wherein the circumference of the support is less than the circumference of the printed circuit board.

16. The pressure sensor assembly of claim 11, wherein the support comprises a lip configured to be secured to the printed circuit board via adhesive.

17. The pressure sensor assembly of claim 11, further comprising an electrical connector including one or more electrical terminals, wherein at least one of the one or more electrical terminals are electrically connected to an output of the sensor unit.

18. A method of sensing pressure comprising:
    applying pressure to a pressure port of a sensor assembly, the sensor assembly comprising a sensor unit having a pressure input port on one side, the sensor unit comprising:
    a printed circuit board;
    a pressure sensor secured to a side of the printed circuit board;
    a support secured to the side of the printed circuit board, the support circumferentially surrounding the pressure sensor and defining the pressure input port; and
    a media isolation layer comprising a first media isolation layer applied adjacent to the pressure sensor, and a second media isolation layer comprising a material different from the first media isolation layer located between the first media isolation layer and the pressure input port;
    deflecting at least a portion of the pressure sensor with the applied pressure;
    measuring the deflection of the pressure sensor; and
    determining a magnitude of the applied pressure based on the measured deflection of the sensor.

19. The method of claim 18, wherein deflecting at least a portion of the pressure sensor comprises compressing the first media isolation layer and the second media isolation layer.

20. The method of claim 18, further comprising electrically communicating the determined magnitude of the applied pressure via an electrical connector.

* * * * *